United States Patent
Drinkard (10) Patent No.: US 7,965,384 B2
(45) Date of Patent: Jun. 21, 2011

(54) CLUTTER REJECTION IN ACTIVE OBJECT DETECTION SYSTEMS

(75) Inventor: John Drinkard, Foster City, CA (US)

(73) Assignee: Omron Scientific Technologies, Inc., Fremont, CA (US)

(*) Notice: Subject to any disclaimer, the term of this patent is extended or adjusted under 35 U.S.C. 154(b) by 364 days.

(21) Appl. No.: 12/237,065

(22) Filed: Sep. 24, 2008

(65) Prior Publication Data

US 2009/0086189 A1    Apr. 2, 2009

Related U.S. Application Data

(60) Provisional application No. 60/975,557, filed on Sep. 27, 2007.

(51) Int. Cl.
*G01C 3/08* (2006.01)

(52) U.S. Cl. ........ 356/5.1; 356/4.01; 356/4.1; 356/5.01; 356/5.15

(58) Field of Classification Search ......... 356/3.01–28.5
See application file for complete search history.

(56) References Cited

U.S. PATENT DOCUMENTS

| | | | |
|---|---|---|---|
| 5,760,887 A * | 6/1998 | Fink et al. .............. | 356/5.03 |
| 6,493,653 B1 | 12/2002 | Drinkard et al. | |
| 6,665,621 B2 | 12/2003 | Drinkard et al. | |
| 6,753,776 B2 | 6/2004 | Drinkard | |
| 2003/0072470 A1 | 4/2003 | Lee | |
| 2006/0233421 A1 * | 10/2006 | Portigal et al. .............. | 382/103 |

* cited by examiner

*Primary Examiner* — Thomas H Tarcza
*Assistant Examiner* — Luke D Ratcliffe
(74) *Attorney, Agent, or Firm* — Coats & Bennett, P.L.L.C.

(57) ABSTRACT

According to a method and apparatus taught herein an active object detection system performs reliable object detection based on light pulse emissions and corresponding and time-of-flight based distance determination, while advantageously rejecting clutter. While not limiting, the method and apparatus taught herein may be particularly advantageous for safety-critical object detection applications, such as where the active object detection system, e.g., a laser scanner, monitors for objects of at least a specified size within a predetermined monitoring radius or contour.

14 Claims, 7 Drawing Sheets

CLUTTER REJECTION IN ACTIVE OBJECT DETECTION SYSTEMS

RELATED APPLICATIONS

This application claims priority under 35 U.S.C. §119(e) from the U.S. provisional patent application filed on 27 Sep. 2007, entitled "Means for Rejecting Spurious Detections in Active Object Detection Systems Operating within Predetermined Sensing Boundaries," and identified by Application No. 60/975,557, the entire contents of which are incorporated herein by reference.

TECHNICAL FIELD

The present invention generally relates to active object detection systems, such as a pulsed laser scanner that measures distance and angular coordinates for objects in a defined sensing area, and particularly relates to clutter rejection in active object detection systems.

BACKGROUND

Active object detection systems use active signaling to detect objects, such as objects within a defined scanning range or monitoring area. Active signaling examples include the emission of laser light or other electromagnetic energy. In general, if an object is sensed to be within a predefined area, then some action is taken by a control circuit within the detection system. The particular action taken by the system may be a function of the detected distance to the object. Active object detection systems therefore commonly include distance-determining mechanisms, such as "pulsed time of flight" (TOF) measurement circuits.

With TOF-based distance determination, the system emits a pulse of light along a defined beam path, and the corresponding return reflection is detected by a photo-receiver within the system. Elapsed timing determination, where the amount of time between the outgoing light pulse transmission and the return reflection pulse reception is determined with high precision, provides the basis for accurate distance measurement. Often, the time delay is measured using specialized electronics, and converted into a distance, d, using the relation $$d = c\frac{t}{2},$$

where c=the speed of light and t=the round-trip time delay.

For scanning-based detection systems, the optical field of view often is rotated synchronously with the pulsed emissions, allowing angular measurements to be correlated to the distance measurements made through TOF. In other words, a scanning system of this type tracks the beam angle and flight time for each emitted pulse, which allows the system to determine the distance and angle of an object relative to the system.

U.S. Pat. No. 6,753,776 to Drinkard discloses a TOF-based laser scanner that includes a housing containing a rotating mirror assembly that sweeps a pulsed laser beam through a desired scanning angle. Return pulses are reflected by the same rotating mirror assembly into a receiver circuit. The TOF of each pulse is measured using a tapped delay line circuit described in U.S. Pat. No. 6,493,653 to Drinkard et al.

With the "tapped delay line" taught by the '653 patent, a laser pulse emission produces a start pulse that is input to a series chain of digital buffers. Each buffer propagates the start pulse to the next buffer in the chain, and each one triggers a corresponding digital capture register that samples a return reflection signal line. Thus, each capture register corresponds to a known depth or position within the buffer chain and, hence, to a known time offset relative to the beginning of the chain. Determining laser pulse flight times thus depends on inspecting capture register contents to determine which capture registers recorded the return reflection pulse. U.S. Pat. No. 6,665,621 to Drinkard et al. teaches advantageous approaches to waveform data processing, as relates to tapped delay lines of the type detailed in the '653 patent.

Regardless of the time-base circuit details, a general operational proposition of many such TOF-based scanners is that a laser pulse is emitted on a given beam projection, and a corresponding reflection is returned by the first object encountered along that beam projection. That proposition generally holds where the first encountered object is larger than the beam cross-section, such that it completely shadows any more distant objects lying behind it along the beam projection. Conversely, the proposition does not hold where the first encountered object is small enough to allow at least a portion of the laser pulse to pass by it. In such cases, multiple return reflections may be generated by a single output pulse; a first return reflection caused by the small object blocking a portion of the pulse, and one or more subsequent return reflections caused by more distant objects along the beam path. It will be understood that the more distant object(s) along the same beam path are illuminated by that portion of the beam passing by the nearer object(s).

Small, near-object reflections are problematic particularly where an active object detection system is required to detect faintly reflecting objects at long sensing ranges with guaranteed measurement accuracy. Such a scanner is very sensitive to small, nearer objects lying between the scanner and a more distant object to be detected. For instance, small airborne particles, puffs of smoke or transitory clouds of suspended dust (for instance concrete dust) may partially block the scanner's view of a more distant object. Because such detection systems are typically configured to respond to a "first object detected" criterion, such "clutter" generates false object detections, leading to unnecessary or inappropriate actions of the control circuit.

Known approaches to mitigating a scanner's susceptibility to clutter-related false detections include requiring the scanner to detect and track objects for two or more consecutive detection times, which may be "scan" related. Another approach requires the scanner to detect an object on at least two adjacent beam angles or directions. The former technique may be understood as a temporal or persistence-based qualification, while the latter technique may be understood as a spatial or size-based qualification. Either of these techniques, or a combination of them, can reduce false object detections associated with small particles flying through a scanning field; however, their effectiveness diminishes greatly for suspended dust particles, which may persist in the air, dispersing slowly compared to the scan time.

In another approach, the scanner operates with a higher reflected pulse detection threshold as a basis for filtering out unwanted clutter. Raising the detection threshold means that the typically weaker reflections characteristic of clutter are not detected by the scanner as object reflections. In other words, the scanner electronics do not "see" weaker reflections that are below an elevated detection threshold. Equivalently, one may also lower the system gain, which drives weaker pulses below a fixed threshold. While such techniques offer good clutter rejection performance, they come at the cost of decreased scanner sensitivity. Sensitivity reduction may not be tolerable, particularly in scanners that are required to reliably detect the faint reflections associated with distant and/or low-reflectance objects.

A modified approach to sensitivity-based clutter rejection adjusts or sets scanner sensitivity based on intended object detection ranges. Higher thresholds are used for shorter detection ranges, while lower thresholds that preserve the scanner's sensitivity are used for long detection ranges. Of course, the lowered detection thresholds used for longer-distance ranges leaves the scanner vulnerable to clutter-related false detection problems.

SUMMARY

According to a method and apparatus taught herein, an active object detection system performs reliable object detection based on light pulse emissions and corresponding time-of-flight based distance determination, while advantageously rejecting clutter. While not limiting, the method and apparatus taught herein may be particularly advantageous for safety-critical object detection applications, such as where the active object detection system, e.g., a laser scanner, monitors for objects of at least a specified size within a predetermined monitoring radius or contour.

In one embodiment, an active object detection system is configured to detect objects of at least a specified size by emitting light pulses and receiving corresponding return reflections. The active object detection system includes a distance determining circuit and a clutter rejection circuit. The distance determining circuit is configured to calculate distance to a detected object by determining an elapsed time between emitting a light pulse and receiving a corresponding return reflection from the object. Complementing distance determining operations, the clutter rejection circuit is configured to reject clutter-related return reflections for instances where more than one return reflection is received for a given light pulse.

In one or more particular embodiments, the active object detection system is configured to monitor for objects according to a predetermined monitoring radius or contour by emitting directed light pulses and monitoring for corresponding return reflections. The clutter rejection circuit is correspondingly configured to determine whether a last one of the more than one return reflections received for a given light pulse is inside or at the predetermined monitoring radius or contour. If so, the clutter rejection circuit identifies that last return reflection as an object-related return reflection for distance determination by the distance determination circuit and ignores or otherwise rejects the other return reflections as clutter-related reflections.

In another embodiment taught herein, a method of active object detection to detect objects of at least a specified size is based on emitting light pulses and receiving corresponding return reflections. The method includes calculating distance to a detected object by determining an elapsed time between emitting a light pulse and receiving a corresponding return reflection from the object, and rejecting clutter-related return reflections for instances where more than one return reflection is received for a given light pulse. Clutter rejection processing in at least one embodiment is based on rejecting as clutter-related return reflections any return reflections preceding a last one of the more than one return reflection received for a given light pulse. One or more embodiments apply strength threshold processing, wherein, for a given light pulse for which more than one return reflection was received, rejecting as clutter-related reflections all but a last one of the more than one return reflection having a minimum strength.

In another embodiment, a method of actively detecting objects comprises monitoring for objects according to a predetermined monitoring radius or contour by emitting directed light pulses and monitoring for corresponding return reflections. The method includes calculating distance to a detected object based on determining elapsed time between emission of the light pulse that produced the return reflection from the object and reception of the return reflection from the object. Further, for an instance where more than one return reflection is received for a given light pulse, the method includes determining whether a last one of the more than one return reflection is inside or at the predetermined monitoring radius or contour. If so, the method treats that last return reflection as an object-related return reflection for object distance determination and ignores the other return reflections as clutter-related reflections.

However, the present invention is not limited to the above summary of features and advantages. Indeed, those skilled in the art will recognize additional features and advantages upon reading the following detailed description, and upon viewing the accompanying drawings.

DETAILED DESCRIPTION

Figure 1:
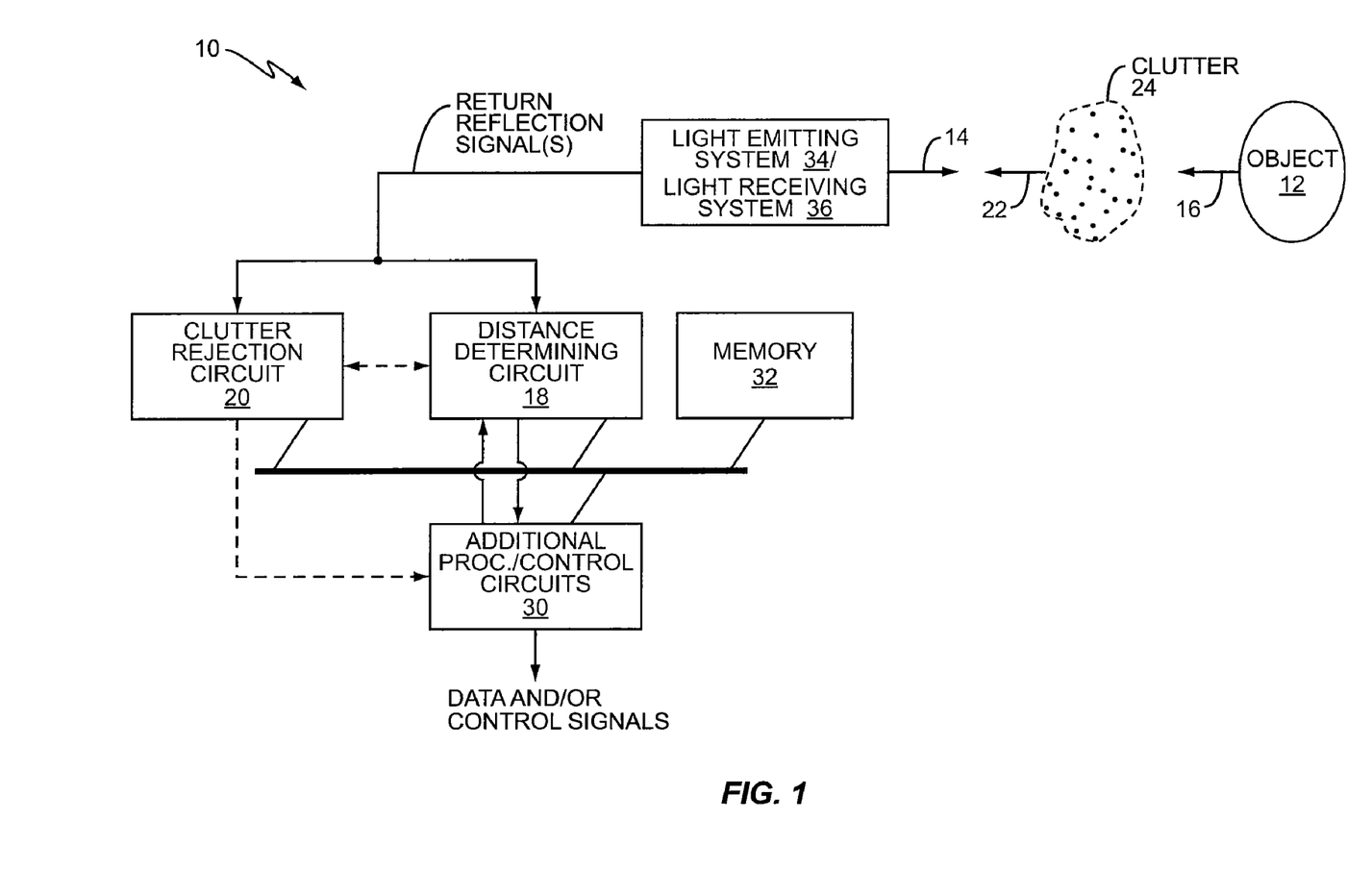
FIG. 1 is block diagram of one embodiment of an active object detection system that includes a time-of-flight based distance determination circuit and a clutter rejection circuit.

FIG. 1 illustrates one embodiment of an active object detection system 10, hereinafter referred to as the "system 10." The system 10 "actively" detects objects in the sense that it emits a pulsed electromagnetic signal and monitors for the presence of objects by detecting return reflections of that signal. In one or more embodiments, the system 10 is configured to detect objects 12 of at least a specified size by emitting light pulses 14 and receiving corresponding return reflections 16.

Supporting this configuration, the system 10 comprises a distance determining circuit 18 that is configured to calculate distance to a detected object 12 by determining an elapsed time between emitting a light pulse 14 and receiving a corresponding return reflection 16 from the object 12. Additionally, the system 10 includes a clutter rejection circuit 20 that is configured to reject clutter-related return reflections 22 for instances where more than one return reflection is received for a given light pulse.

That is, according to the "normal" proposition, the system 10 expects to see no more than one reflection returned for each light pulse 14 that it emits, but with clutter the system 10 will often receive one or more clutter-related return reflections 22 in conjunction with receiving an object-related return reflection 16 from an actual object 12. Reception of clutter-related reflections 22 result from, for example, the emitted light pulse 14 striking one or more small particles—generally denoted as "clutter 24"—lying in the beam path of the emitted light pulse 14.

Continuing with the illustrated example details, the system 10 includes one or more additional processing and control circuit 30, which may include system control and input/output interface circuits, and one or more memory circuits 32. The illustrated circuits, including the distance determining circuit 18 and the clutter rejection circuit 20, may be implemented in hardware, in whole or part, and may include a mix of integrated and discrete circuits. On the other hand, at least some embodiments of the system 10 advantageously implement all or part of the illustrated circuits with high integrations, such as microprocessor-based or digital signal processor-based implementation.

In any case, the system 10 further includes a light emitting system 34 and a light receiving system 36. Example implementations of these systems are shown later herein, but it should be understood in general that they may be complex systems including mechanical, optical, and electrical components. In at least one embodiment, the light receiving system 36 includes a photo-detector, such as an avalanche photodiode, that is configured to generate an output signal (a return reflection signal) that can be evaluated (in analog and/or digital form) by the system 10, for detection and evaluation of return reflections. In one embodiment, the return reflection signal is an analog signal line to which a noise threshold is applied, and the noise-qualified version of the return reflection signal is digitized for return reflection processing, including clutter rejection processing and distance determination processing.

Figures 2, 3, 4:
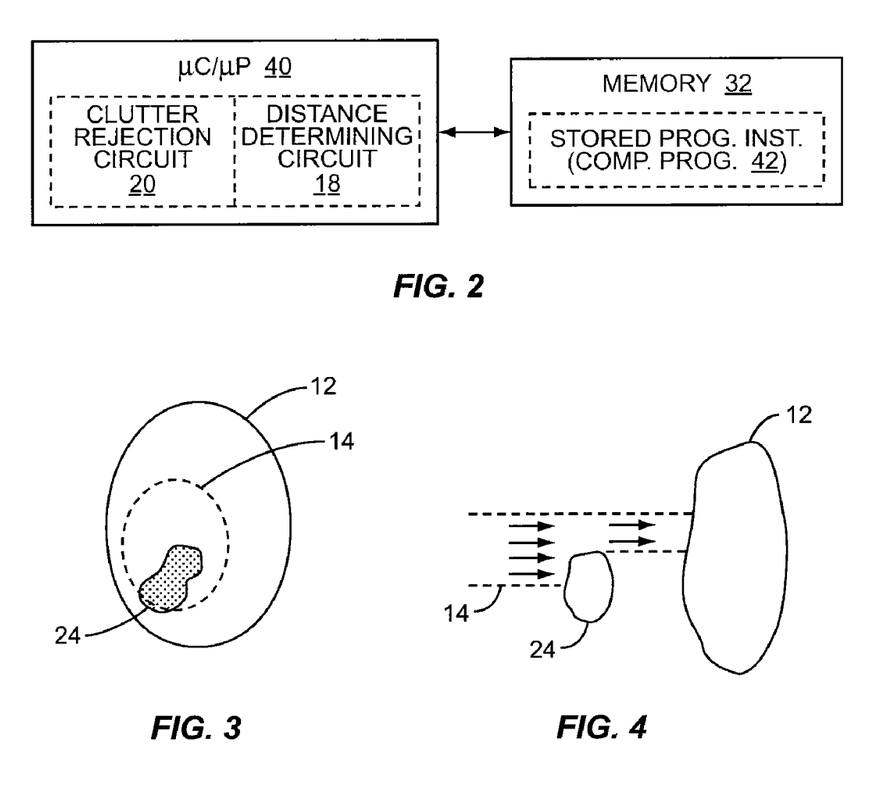
FIG. 2 is a block diagram of an example digital processing circuit implementation of distance measurement and clutter rejection circuits.
FIGS. 3 and 4 are diagrams of example object detection scenarios where clutter-related reflections interfere with object detection and distance determination.

Complementing this digital processing, FIG. 2 illustrates an embodiment of the system 10 wherein the distance determining circuit 18 and the clutter rejection circuit 20 are implemented within a digital processing circuit 40, which may comprise a microprocessor/microcontroller, a Field Programmable Gate Array (FPGA), or an Application Specific Integrated Circuit, which may integrate a microprocessor or digital signal processor core. In one or more such embodiments, the memory 32, which can comprise different memory types, such as FLASH, EEPROM, along with working RAM (SRAM, DRAM, etc.), stores computer program instructions 42 for execution by the digital processing circuit 40. In one such embodiment, the method teachings herein are carried out by executing a computer program stored in a computer-readable medium, e.g., memory 32, wherein the distance determining circuit 18 and/or the clutter rejection circuit 20 are implemented in whole or part by execution of program instructions in the digital processing circuit 40.

In particular, the clutter rejection circuit 20 may be implemented as a processing algorithm that is invoked or otherwise applied by the system 10 in instances where more than one return reflection is received for a given emitted light pulse 14. FIGS. 3 and 4 illustrate example circumstances giving rise to such instances—neither figure is meant to depict actual scale. In FIG. 3, one sees that the beam diameter of the emitted light pulse 14 is smaller than the object 12—typically, the system 10 is configured such that the specified minimum object size is many times larger than the beam diameter. On the other hand, one sees an item of clutter 24 that is smaller than the beam diameter, or similarly sized, thereby allowing at least a portion of the emitted light pulse 14 to pass by the clutter 12. The portion of the light pulse 14 that passes by the clutter 24 may strike more clutter 24 and/or may strike an actual object 12. One sees that scenario more clearly illustrated in FIG. 4.

Figure 5:
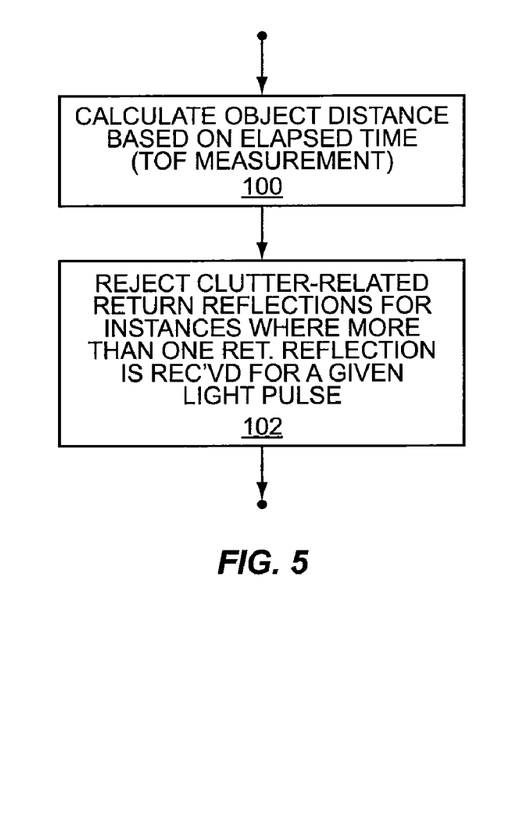
FIG. 5 is a logic flow diagram of one embodiment of a method of clutter rejection processing.

To preserve the object detection and distance determination performance of the system 10, while making its operation robust in the presence of clutter 24, the system 10 is configured to implement a method such as the one represented in the example logic flow diagram of FIG. 5. According to the illustrated processing logic, the system 10 calculates distance to a detected object 12 by determining an elapsed time between emitting a light pulse 14 and receiving a corresponding return reflection 16 from the object (Block 100). According to such processing, the system 10 rejects clutter-related return reflections 22 for instances where more than one return reflection is received for a given light pulse 14 (Block 102). As an example, the system 10 may receive one or more clutter-related return reflections 22 in conjunction with receiving a return reflection 16 from an actual object 12 that is at least of the size intended to be detected by the system 10.

Figure 6:
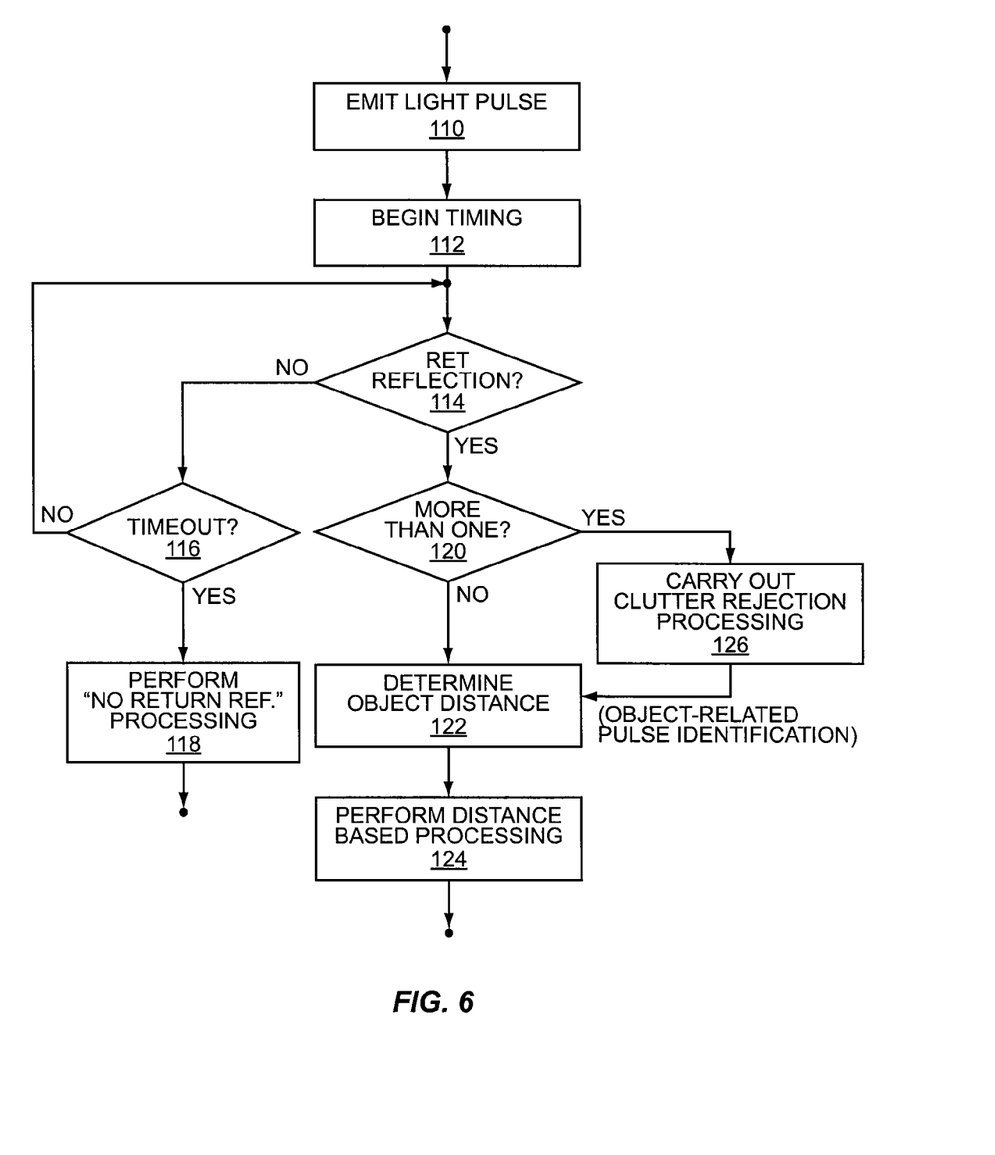
FIG. 6 is a logic flow diagram that provides example processing details for the method of FIG. 5.

FIG. 6 provides more detail for one embodiment of the method depicted in FIG. 5. According to the more detailed logic flow diagram, the system 10 emits a light pulse 14 (Block 110) and begins timing, e.g., begins recording, measuring, or otherwise tracking elapsed time (Block 112). During this timing, which is limited by a timeout duration corresponding to the maximum detection range of the system 10 in one or more embodiments, the system 10 essentially monitors for the reception of return reflections. That is, if no return reflection is received (no from Block 114), the system 10 determines whether reception monitoring has timed out for the current light pulse. If not (no from Block 116), the system 10 continues waiting for return reflections. If the system 10 does timeout (yes from Block 116), it carries out processing as appropriate for the case where no return reflections are received (Block 118), e.g., it may continue on by emitting a next light pulse 14 in a next beam direction and repeat the reflection monitoring process.

On the other hand, if the system 10 does receive at least one return reflection (yes from Block 114), processing continues with determining whether more than one return reflection was received (Block 120). Implicit in this processing is the fact that the system 10 is configured with optical receiving and associated electronic processing circuits that are capable of receiving and recording multiple return reflections for each light pulse emission. In one embodiment, the system 10 includes a tapped delay line and associated supporting electronics like or similar to those shown in U.S. Pat. No. 6,493,653, which was previously identified herein as a non-limiting example of using a tapped delay line register for laser pulse TOF measurement. A serial chain of capture registers driven by respective delay outputs of a tapped delay line can easily record multiple return reflections.

If only one return reflection was received for the given light pulse emission (no from Block 120), processing continues with determining object distance (Block 122), i.e., calculating the elapsed time from the emission of the light pulse 14 to the reception of the return reflection 16 from the given object 12. Processing continues with carrying out distance-based processing (Block 124), where the particular actions taken (or not taken) by the system 10 depend on the calculated distance of the object 12 and on the configuration of the system 10. For example, the system 10 may take action or defer taking action, such as deactivating a machine control output, based on whether the calculated distance is greater than or less than a predetermined safety-critical radius.

Alternatively, if more than one return reflection was received for the given light pulse emission (yes from Block 120), processing continues with carrying out clutter rejection processing (Block 126). In at least one embodiment, clutter rejection processing comprises the clutter rejection circuit 20 evaluating the return reflections received for a given light pulse 14, to differentiate between any clutter-related return reflections 22 and an object-related return reflection 16. Such processing may, for example, be configured to assume that one of the more than one return reflection is the object-related return reflection 16 and that any remaining ones of the return reflections are clutter-related return reflections 22. By identifying or otherwise distinguishing the object-related return reflection 16, the system 10 can still make an accurate and reliable object distance calculation, even though multiple return reflections were received.

For example, the distance determining circuit 18 may be configured to record all return reflections received for a given light pulse (at least within any physical or logical limits), and the clutter rejection circuit 20 may be configured to determine which one of the return reflections represents an object reflection, as opposed to clutter reflections. The distance determining circuit 18 or other circuitry within the system 10 may calculate distances for all reflections, or at least may store raw data for all reflections (elapsed time values, signal strengths, reflection pulse widths, etc.). However, with the advantageous clutter-rejection processing taught herein, the system 10 uses the distance determination from the actual object-related return reflection to make processing decisions, e.g., decisions about whether to switch states, such as switching from a run-state to a stop-state in response to detecting an object that violates a minimum allowed distance.

Thus, it should be understood that clutter rejection processing may or may not prevent the underlying reflection capture and related distance determinations carried out by the system 10 for received return reflections—some embodiments do suppress such processing for clutter reflections—but clutter rejection processing does allow the system 10 to differentiate between clutter-related reflections and object-related reflections for object distance determinations.

Figure 7:
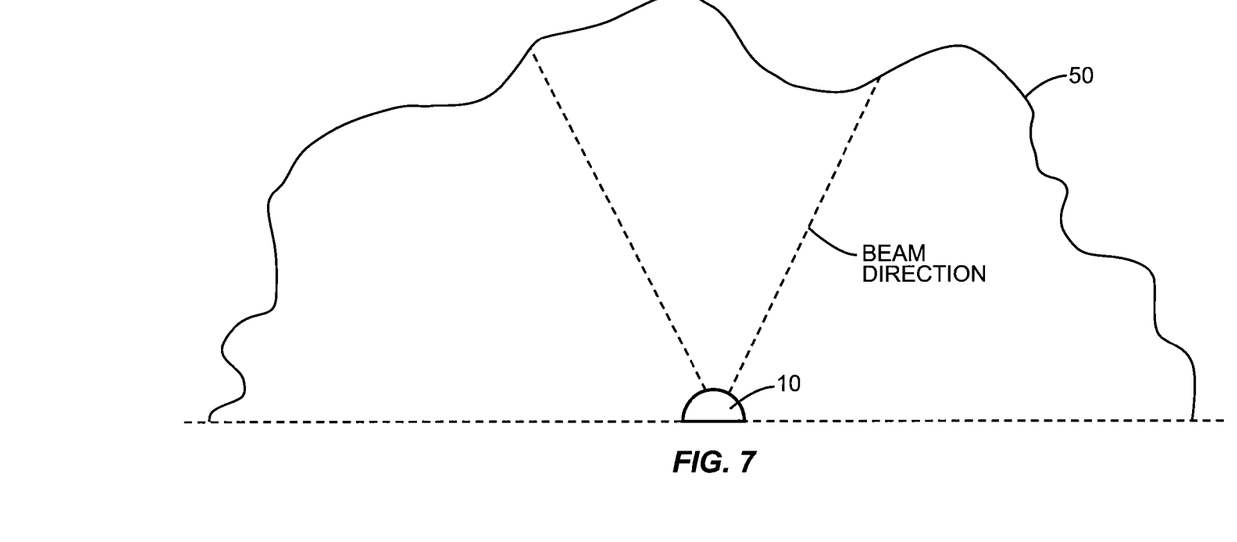
FIG. 7 is a diagram of one embodiment of an active object detection system that is configured to perform active object detection in or along a predetermined monitoring radius or contour.

In one embodiment, the clutter rejection circuit 20 is configured to implement clutter rejection processing according to a method wherein the system 10 detects objects within or along a determined monitoring boundary or contour. For example, FIG. 7 illustrates a configuration of the system 10 wherein it monitors for objects according to a predefined monitoring contour 50, which may be defined by placing the system 10 into a configuration mode or boundary learning mode, wherein the system 10 can scan or otherwise sweep its emitted light pulses over a one-, two-, or three-dimensional space, to memorize a given set of objects as a "background" or expected image. Doing so allows the system 10 to detect objects that deviate from the known background, e.g., any object that interposes itself between the system 10 and the predetermined contour 50. Note that FIG. 7 depicts a 180 degree scan plan, which may be scanned repeatedly by the system 10 by, for example, stepping through the 180 degree scan plane in sub-degree increments, where a light pulse 14 is emitted at each incremental position and any object-related return reflections evaluated for distance evaluation.

With this example scanning in mind, the clutter rejection circuit 20 is configured in one or more embodiments to perform clutter rejection processing for instances where the emission of a given light pulse 14 produces more than one return reflection. In one embodiment, for a given light pulse 14 for which more than one return reflection was received, the clutter rejection circuit 20 is configured according to a method wherein it rejects as clutter-related return reflections any return reflections preceding a last one of the more than one return reflection.

Figure 8:
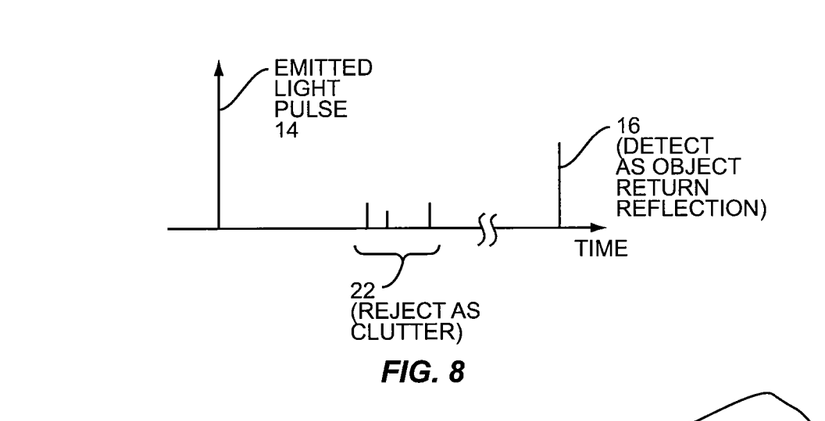
FIGS. 8 and 9 are diagrams of example clutter rejection processing, depicted in terms of return reflection time of arrivals and reflection pulse strengths.

Such processing is illustrated in FIG. 8, which illustrates a time window wherein clutter-related rejections 22 are received in advance of receiving a later-arriving object-related return reflection 16. The clutter rejection circuit 20 identifies or otherwise indicates to the distance determining circuit 18 which one of the multiple return reflections to use for distance determination. For example, the system 10 may sample one or more electrical signals that are dynamically responsive to reception of return reflections, such that samples (e.g., digital samples) are recorded for all return reflections. Elapsed time information may be recorded in conjunction with all such samples. Alternatively, the samples may inherently carry elapsed timing information, as in tapped delay line embodiments where the delay line position of a given digital sample capture register provides elapsed timing information (based on the known timing offsets of each delay line position). In any case, the clutter rejection circuit 20 can indicate which return reflection event data and/or elapsed time information to use for object distance calculations. The indication may comprise, for example, a memory pointer to elapsed time count data or may comprise delay line capture register position information, relating to the object-related return reflection 16. Those skilled in the art will appreciate that there are numerous other ways for the clutter rejection circuit 20 to indicate to the distance determining circuit 18 which one of the more than one return reflection received for a given light pulse emission should be used for object distance determination.

Figure 9:
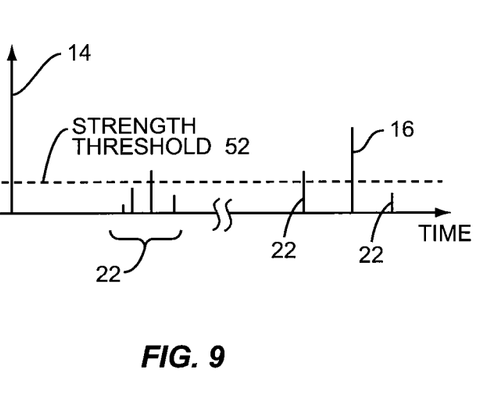

In another embodiment, the system 10 implements a method wherein it detects objects 12 within or along a determined monitoring boundary or contour 50, and wherein, for a given light pulse 14 for which more than one return reflection was received, the clutter rejection circuit 20 rejects as clutter-related reflections all but a last one of the more than one return reflection having a minimum strength. This approach to clutter-rejection is shown in FIG. 9, which is similar to the processing of FIG. 8, except that the last return reflection that meets a minimum strength threshold 52 is deemed to be the object-related return reflection 16. Any later-arriving return reflections below the minimum strength threshold 52 are deemed to be clutter-related and are thus ignored or otherwise rejected.

The strength threshold 52 can be applied to an analog return reflection signal line or to digitized return reflection values. Those skilled in the art will appreciate that the light receiving system 36 can, as was explained earlier, provide one or more analog or digital signal lines that are dynamically responsive to the reception of return reflections, and that such signals can be evaluated for signal strength. Thus, in one or more embodiments, the clutter rejection circuit 20 or another circuit within the system 10 is configured to implement a method of determining strengths of return reflections. For example, the strength of return reflections may be determined by determining reflection pulse width, performing reflection pulse integration, or determining reflection pulse amplitude.

Figure 10:
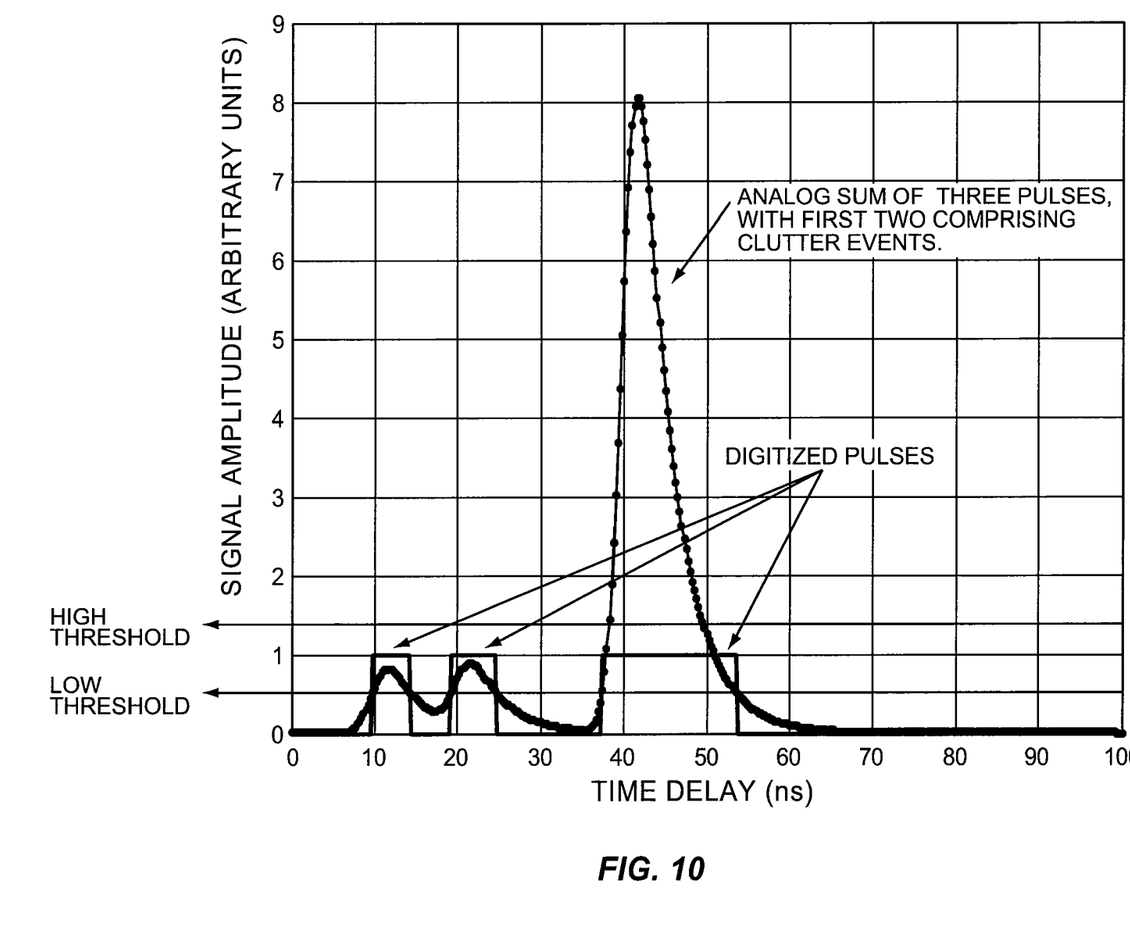
FIG. 10 is a diagram of another example of clutter rejection processing, based on the use of high and low strength thresholds.

FIG. 10 illustrates clutter rejection processing in an example embodiment, wherein high and low strength thresholds are used. One sees two earlier-in-time return reflection pulses that exceed the low threshold, which may be used for noise rejection purposes—i.e., anything below the low threshold is ignored altogether. However, only the third (last) pulse exceeds the high threshold, such that distance determination is performed for the last pulse.

Broadly, then, in at least one embodiment of the system 10, rejecting clutter-related return reflections comprises identifying individual ones of the more than one return reflection received for a given light pulse as clutter-related or object-related based on evaluating at least one of a reception order for the more than one return reflection and evaluating signal strengths for the more than one return reflection on a relative or absolute basis. Also, as noted, the system 10 may be configured for object detection processing based on expecting a return reflection corresponding to a known object distance, for one or more light pulse directions (e.g., known boundary distances at known scan angles), and performing clutter rejection processing for the one or more light pulse directions by ignoring or otherwise rejecting all but a last return reflection received for a light pulse emitted in a given light beam direction, or by ignoring all but a last strength-qualified return reflection received for the light pulse.

In a particular embodiment that is useful for hazardous machine safeguarding and other safety-critical object detection applications, the system 10 may be configured to monitor for objects 12 according to a predetermined monitoring radius or contour 50 by emitting directed light pulses 14 and monitoring for corresponding return reflections. An example of this configuration was shown in FIG. 7. In any case, the system 10 rejects clutter-related return reflections for instances where more than one return reflection is received for a given light pulse 14 by determining whether a last one of the more than one return reflection is inside or at the predetermined monitoring radius or contour 50 and, if so, treating that last return reflection as an object-related return reflection 16 for distance determination and ignoring the other return reflections as clutter-related reflections 22.

In one or more other embodiments, rejecting clutter-related return reflections for instances where more than one return reflection is received for a given light pulse comprises pre-sampling a "clutter background" for one or more beam directions along which light pulses 14 are emitted, and subtracting the clutter background determined for a given beam direction from an overall return reflection signal obtained for a given light pulse 14 emitted on the given beam direction. Such processing isolates an object-related return reflection component of the overall return reflection signal, for object distance determination.

Such an approach recognizes that the finite duration of the emitted light pulses 14 gives rise to limitations in rejection power. For instance, for short sensing ranges, it may not be possible to separate reflections. The use of multiple bit digitizing circuits for reflection signal processing on one or more embodiments of the system 10 allows the system 10 to pre-sample the clutter background, and subtract it from the total return reflection signal, effectively isolating and resolving any reflection from a "true" object 12. Of course, such processing need not be done within one sample period—for example, such an algorithm can be configured to span multiple sampling periods.

Figure 11:
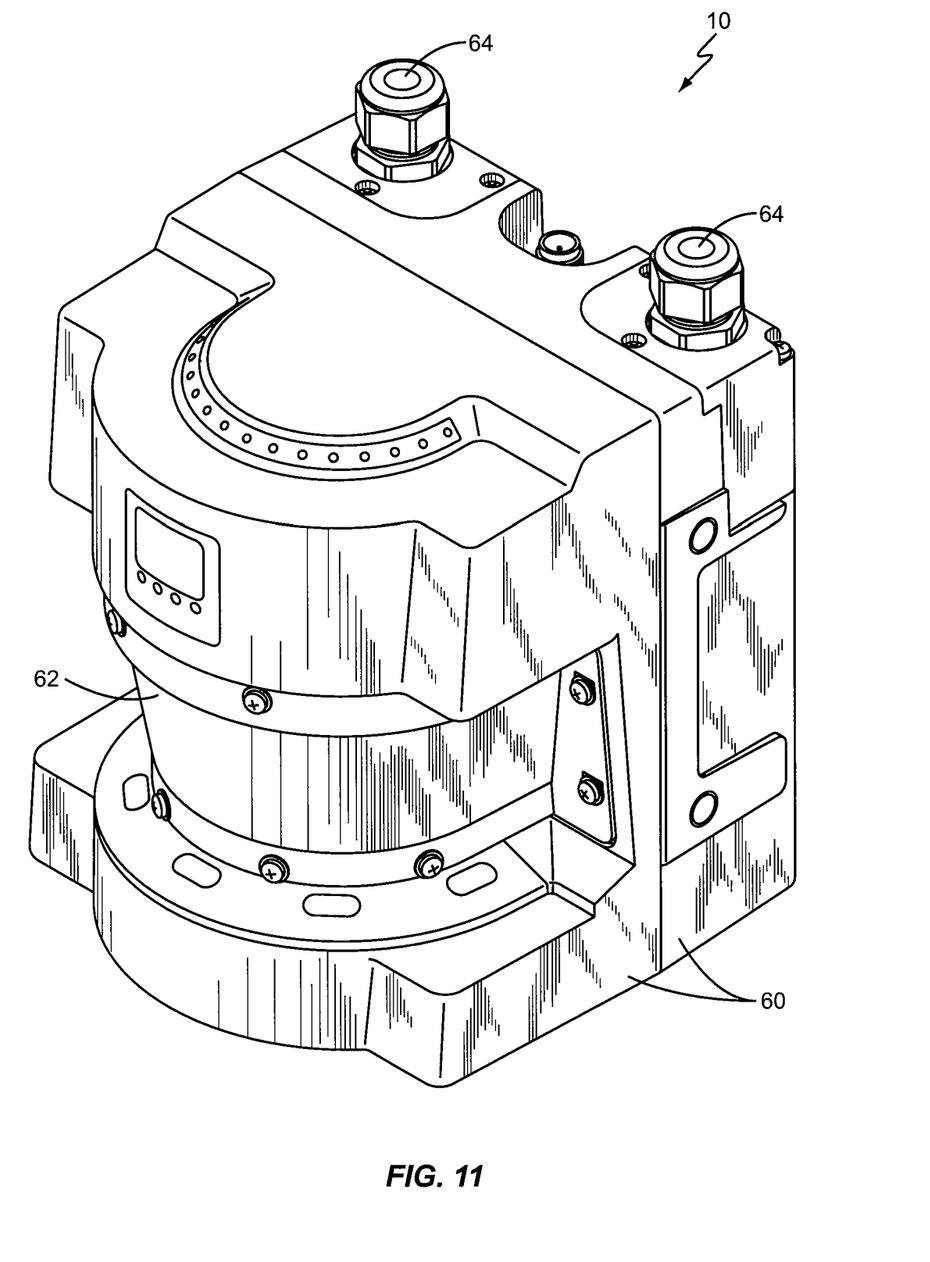
FIG. 11 is a perspective view of an example laser scanner embodiment of an active object detection system, which is configured to carry out clutter rejection processing.

Such sampling periods may be defined by the scanning rate of the system 10, at least where the system 10 is configured as a scanning system. As a non-limiting example, FIG. 11 illustrates an embodiment of the system 10 wherein it comprises a laser scanner having a housing 60, a scanning window 62, and one or more input/output interfaces 64. These interfaces may be used for electrically/communicatively interconnecting the system 10 with external machinery, power control switches, local area networks or other communication networks, etc.

In operation, the system 10 sweeps a pulsed light beam (e.g., a laser beam) through the window 62, which generally is configured according to the desired angular range to be scanned, e.g., 180 degrees. The light emitting system 34 as shown in FIG. 1 may include a rotating deflection element (e.g., prism or mirror) that is centered behind the window 62, within the interior of the housing 60. In this manner, light pulses 14 can be emitted outward through the window at successive angular positions.

Figure 12:
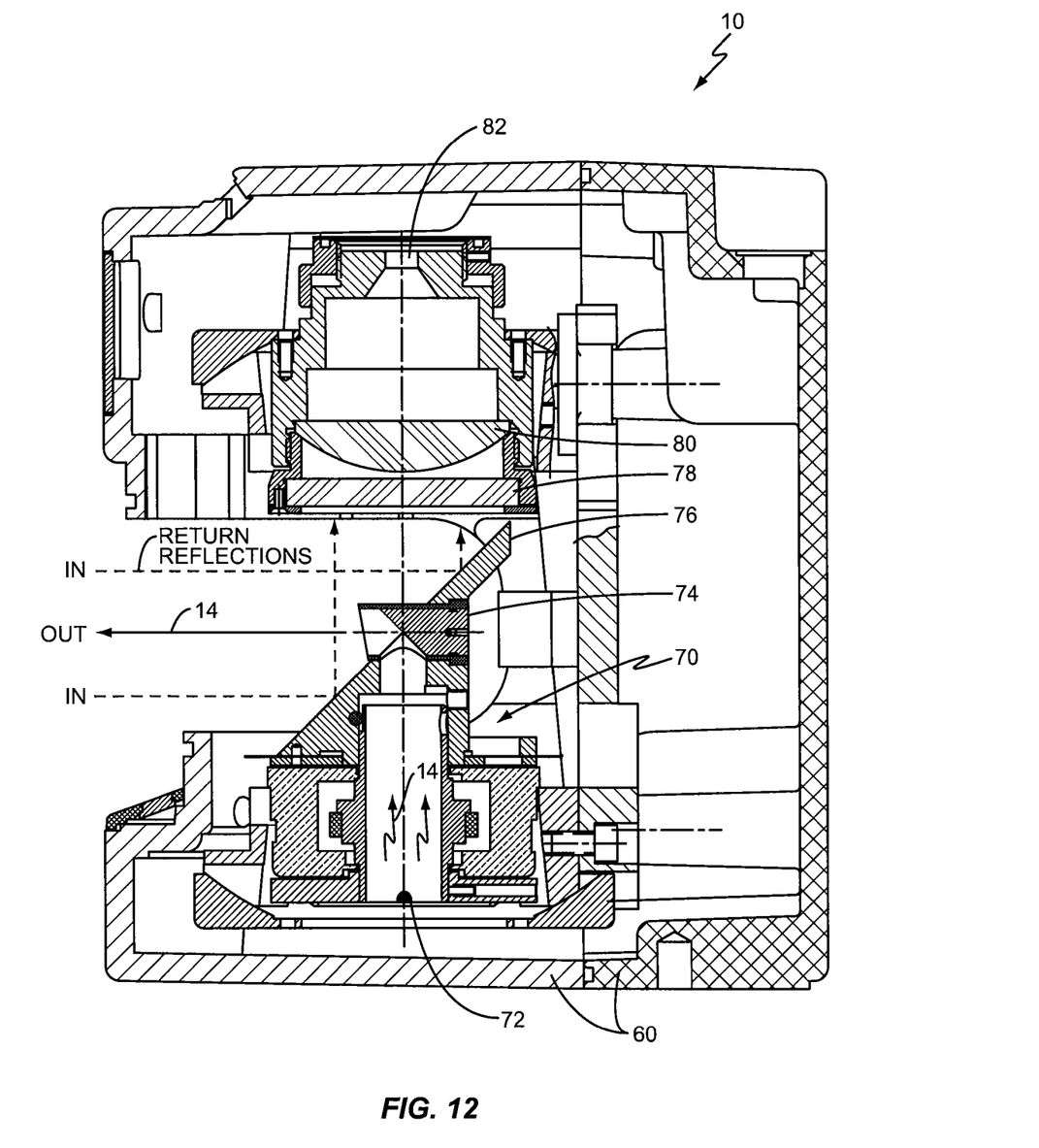
FIG. 12 is a cross-sectional (side) view of the laser scanner of FIG. 11, and it provides example details for selected mechanical, optical, and electro-optical aspects of the light emitting and light receiving systems introduced in FIG. 1.

For example, FIG. 12 provides a cross-sectional view of the laser scanner embodiment shown in FIG. 11. Here, one sees that the light emitting system 34 includes a motor-mounted rotating mirror assembly 70. A (stationary) laser diode 72 is mounted below the rotating mirror assembly 70 and shines upward through a hollow motor shaft in the mirror assembly 70, where light pulses 14 from the laser diode 72 strike a transmit mirror 74. The transmit mirror 74 deflects the light pulses 14 outward through the window 62 (not shown in FIG. 12). Emitting light pulses in this manner while the mirror assembly rotates sweeps the light pulses 14 across an area to be monitored, effectively defining a scanning plane.

The mirror assembly 70 includes an encoder in one or more embodiments, e.g., an optical encoder wheel that allows the rotational angle of the mirror assembly to be tracked. Encoder feedback also can be used for closed-loop control of mirror RPM. Further, more complex assemblies can be used (oscillating and/or multi-axis articulations) to effect three-dimensional area monitoring.

Further details of interest in FIG. 12 include the example illustrations given for the light receiving system 36 introduced in FIG. 1. Here, one sees that the rotating mirror assembly 70 includes a light receiving mirror 76, which is configured to receive return reflections incoming to the system 10 through the front window 62. Notably, in this configuration, the light receiving mirror 76 is coaxial or quasi-coaxial with the light transmitting mirror 74. In general, the light receiving system 36 is aligned on the same beam path as the light emitting system 34, such that any return reflections received by the light receiving system 36 are from the particular object 12 illuminated by the outgoing light pulse 14.

Turning back to FIG. 12, one sees other light receiving system elements, such as lenses 78 and 80, and a photodetector 82. The electronics are not shown in FIG. 12, but those skilled in the art will appreciate that one or more circuit boards or other electronic assemblies are carried within the interior of the housing 60, including circuit elements comprising the distance determining circuit 18 and the clutter rejection circuit 20 that are of particular interest herein.

Of course, the particular arrangement of mechanical, optical, and electrical components adopted for the system 10 will depend on its intended use, and the clutter rejection processing teachings presented herein are directly applicable to a broad range of pulsed-light object detection systems. Such teachings provide for short range clutter rejection, for example, while advantageously preserving long range detection capability. In one or more embodiments, these performance improvements are obtained through the use of narrow pulse emission, in combination with multiple reflection detection capability.

As non-limiting examples, an active object detection scanner may be configured to have multiple reflection detection capability—i.e., the ability to detect multiple reflections for one pulse emission along a given beam path—through the use of transient digitizers, high speed analog to digital converters (ADCs), or tapped delay line registers, or by using other return reflection detection capabilities. In one or more particular configurations, the emitted light beam cross section is configured to be smaller than the intended target (smaller than the minimum object size that the system 10 in intended to detect), so that the logical argument may be made that the "last pulse reflection" detected for a given emitted pulse is the reflection of primary interest. With that logical premise, "clutter events" are reflections detected ahead of the last, primary pulse reflection, and they necessarily result from the emitted pulse striking very small objects that block only a small cross section of the emitted beam, thereby letting most of the energy pass by along the beam path.

Advantageously, the technique of ignoring clutter reflections is considered in the safety context, such as where the proposed system 10 serves as a machine guarding system. In this context, an unfortunately timed background light pulse might appear as a last, primary reflection, causing the system 10 to perceive an earlier returned reflection as a clutter return, rather than as a "real" object detection event. However, to avoid this situation in real applications, the clutter rejection circuit 20 may be configured to require that the last reflection pulse detected within a predetermined sensing radius or contour be interpreted as the detected object. In this way, objects producing secondary reflections which occur outside the predetermined sensing distance may be ignored.

In a more detailed example, the system 10 in one or more embodiments is configured for "contour monitoring mode" operation. With contour monitoring mode, the system 10 learns the location of the nearest object for each beam angle or direction the scanner uses for monitoring. In other words, the system 10 learns a fixed object contour and "expects" to see this fixed object contour during normal operation. More particularly, in normal operation, the system 10 requires the detection of that learned object contour on every scan.

As an example of reference boundary monitoring, assume an area guarding application where the system 10 is monitoring the floor of an enclosed cell that includes a door. One may further assume that the system 10 learned the cell contour with the door in its closed position. As such, opening the cell door during normal scanning operation of the system 10 causes the system 10 to switch states (e.g., it may switch from a run-state to a stop-state, wherein the stop-state de-energizes one or more machine control relays) because opening the cell door cause the contour observed by the system 10 to change with respect to the learned contour.

One method embodiment according to the above teachings comprises, in a learning mode of the system 10, scanning an area bounded by a fixed contour as defined by one or more fixed objects. Such scanning is based on emitting a light pulse at each of a number of scan positions, receiving a return reflection from the fixed contour, calculating the contour distance for that scan position based on elapsed time between the light pulse and the return reflection, and remembering the distance. The method further includes, in a monitoring mode of the system 10, scanning the bounded area and detecting whether any object-related reflections deviate from the remembered distances. The system 10 rejects clutter-related return reflections while monitoring, for instances where more than one return reflection is received for a given light pulse.

In this context, rejecting clutter-related return reflections comprises, for instances in which more than one return reflection was received for a light pulse emitted at a given scan position, determining whether a last one of the return reflections matches the remembered distance for that scan position. If so, the system 10 rejects any preceding return reflections as clutter-related return reflections.

It also should be noted that, if reference boundary monitoring is used, objects detected outside the reference boundary imply the boundary has move, and will thus lead to a change in state—in other words, objects detected outside the reference boundary are not necessarily ignored. There is still a possibility of misdetection in some cases. However, in safety applications, for example, the above qualification will always avoid misdetection of a true object within predefined sensing (for instance—safety) boundaries.

Finally, to ensure any secondary reflection detection occurring within the predetermined boundary is strong enough to guarantee the required detection capability (or accuracy), a condition of minimum strength may be applied through whatever qualification processing the system 10 is configured with. For instance, if an analog-to-digital converter is used to process an analog return reflection signal from the system's photo-detector, the system 10 may be configured to the area on the pulse, or the system 10 may be configured to measure pulse width, such as would be possible where a limiting amplifier is used. These qualification techniques or others also may also be used where the system 10 is configured with a tapped delay line register-based capture system or other form of transient waveform digitizer.

Of course, those skilled in the art will recognize that use as non-limiting. Indeed, the present invention is not limited to the foregoing discussion and accompanying drawings. Instead, the present invention is limited only by the following claims and their legal equivalents.

What is claimed is:

1. A method of actively detecting objects of at least a specified size comprising:
   in a learning mode, scanning an area bounded by a fixed contour as defined by one or more fixed objects, based on emitting a light pulse at each of a number of scan positions, receiving a return reflection from the fixed contour, calculating the contour distance for that scan position based on elapsed time between the light pulse and the return reflection, and remembering the distance;
   in a monitoring mode, scanning the bounded area and detecting whether any object-related reflections deviate from the remembered distances; and
   rejecting clutter-related return reflections while monitoring, for instances where more than one return reflection is received for a given light pulse.

2. The method of claim 1, wherein rejecting clutter-related return reflections comprises, for instances in which more than one return reflection was received for a light pulse emitted at a given scan position, determining whether a last one of the return reflections matches the remembered distance for that scan position and, if so, rejecting any preceding return reflections as clutter-related return reflections.

3. An active object detection system configured to scan for the presence of objects within a predetermined monitoring boundary, said active object detection system comprising:
   a light emitting system and a light receiving system configured to emit a light pulse at each of a number of scan positions and detect return reflections received for each scan position;
   a distance determining circuit configured to calculate the distance corresponding to any given return reflection based on determining an elapsed time between emission of the light pulse corresponding to the given return reflection and reception of the given return reflection;

a clutter rejection circuit operatively associated with the distance determining circuit and configured to detect objects inside the predetermined boundary based on being configured to:

in the instance where only one return reflection is received for a given light pulse emitted at a given scan position, determine whether an object is inside the predetermined boundary by determining whether the distance calculated for the one return reflection is less than a known boundary distance for the given scan position; and in the instance where multiple return reflections are received for the given light pulse emitted at the given scan position, determine whether an object is inside the predetermined boundary by ignoring all but a last one of the multiple return reflections and determining whether the distance calculated for the last return reflection is less than the known boundary distance for the given scan position; and a control circuit configured to assert a control output responsive to the clutter rejection circuit detecting that an object is inside the predetermined monitoring boundary.

4. The active object detection system of claim 3, wherein the clutter rejection circuit identifies the last return reflection among the multiple return reflections as the last return reflection that meets a minimum strength.

5. The active object detection system of claim 4, wherein the clutter rejection circuit or an associated circuit within the active object detection system determines strengths of return reflections based on determining reflection pulse width, performing reflection pulse integration, or determining reflection pulse amplitude.

6. The active object detection system of claim 3, wherein the active object detection system is configured to operate in a learning mode and in a monitoring mode, and wherein in said learning mode the active object detection system learns the monitoring boundary by remembering the distance calculated for the one return reflection or the last one of the multiple return reflections received for each scan position as said known boundary distance for the scan position, and wherein in said monitoring mode the active object detection system performs one or more control actions responsive to detecting that an object is closer than said predetermined boundary.

7. The active object detection system of claim 3, wherein the light transmitting system is configured to emit light pulses in a plurality of beam directions defining a scanning plane or area, and the light receiving system that is coaxial or quasi-coaxial with the light transmitting system, such that the light receiving system receives return reflections along the same beam directions as the light transmitting system emits light pulses.

8. The active object detection system of claim 7, wherein the light transmitting and light receiving systems include a movable light pulse deflector configured to deflect light pulses in defined directions outward from the active object detection system, and a movable return reflection deflector configured to deflect return reflections incoming to the active object detection system to a light detector configured to generate one or more electrical signals responsive to the return reflections.

9. The active object detection system of claim 3, wherein the active object detection system is configured to learn a boundary as said predetermined monitoring boundary and to monitor for changes or deviations from said predetermined monitoring boundary.

10. A method of active object detection based on scanning for the presence of objects within a predetermined monitoring boundary, said method comprising:

emitting a light pulse at each of a plurality of scan positions and detecting return reflections received for the emitted light pulses;

calculating the distance corresponding to a given return reflection by determining an elapsed time between emitting the light pulse corresponding to the given return reflection and reception of the given return reflection;

in instances where only one return reflection is received for a given light pulse emitted at a given scan position, detecting whether an object is inside the predetermined boundary by determining whether the distance calculated for the one return reflection is less than a known boundary distance for the given scan position; and in instances where multiple return reflections are received for the given light pulse emitted at the given scan position, detecting whether an object is inside the predetermined boundary by ignoring all but a last one of the multiple return reflections and determining whether the distance calculated for the last return reflection is less than the known boundary distance for the given scan position; and asserting a control output responsive to detecting that an object is inside the predetermined monitoring boundary.

11. The active object detection system of claim 10, further comprising identifying the last return reflection among the multiple return reflections as the last return reflection that meets a minimum strength.

12. The method of claim 11, further comprising determining strengths of return reflections based on determining reflection pulse width, performing reflection pulse integration, or determining reflection pulse amplitude.

13. The method of claim 10, further comprising learning the predetermined monitoring boundary by remembering the distance calculated for the one return reflection or the last one of the multiple return reflections received for each scan position as said known boundary distance for the scan position, and, subsequent to said learning, taking one or more control actions responsive to detecting that an object is closer than said predetermined monitoring boundary.

14. The method of claim 10, further comprising learning a boundary as said predetermined monitoring boundary and monitoring for changes or deviations from said predetermined monitoring boundary.

* * * * *